(12) United States Patent
Anderson et al.

(10) Patent No.: US 9,183,569 B1
(45) Date of Patent: Nov. 10, 2015

(54) AUTOMATIC GENERATION OF TEXT AND DISPLAY FOR PRESENTATION ON ONLINE COMPUTERS

(71) Applicant: driveMATIC, LLC, Sarasota, FL (US)

(72) Inventors: Phil Anderson, Sarasota, FL (US); Adam Rouff, Smithtown, NY (US); Christopher Burns, Nokomis, FL (US)

(73) Assignee: DRIVEMATIC, LLC, Sarasota, FL (US)

( * ) Notice: Subject to any disclaimer, the term of this patent is extended or adjusted under 35 U.S.C. 154(b) by 0 days.

(21) Appl. No.: 14/495,417

(22) Filed: Sep. 24, 2014

(51) Int. Cl.
*G06Q 30/00* (2012.01)
*G06Q 30/02* (2012.01)

(52) U.S. Cl.
CPC ........ *G06Q 30/0256* (2013.01); *G06Q 30/0276* (2013.01)

(58) Field of Classification Search
CPC .................................. G06Q 30/0276
USPC ...................................... 705/14.72
See application file for complete search history.

(56) References Cited

U.S. PATENT DOCUMENTS

| | | | |
|---|---|---|---|
| 6,519,568 B1* | 2/2003 | Harvey et al. | 705/1.1 |
| 6,990,633 B1* | 1/2006 | Miyasaka et al. | 715/201 |
| 2011/0288931 A1* | 11/2011 | Kuhn et al. | 705/14.49 |
| 2012/0036033 A1* | 2/2012 | Seergy et al. | 705/26.3 |

* cited by examiner

*Primary Examiner* — John G Weiss
*Assistant Examiner* — Scott C Anderson
(74) *Attorney, Agent, or Firm* — Scully, Scott, Murphy & Presser, PC

(57) ABSTRACT

Text and display may be generated automatically for an online service platform. Dynamic data is received from a provider offering items, the data comprising information about the items. Content is generated and keywords are assigned to the content. Content may include dynamic text and images. The generated content and keywords are configured into the online service via an application programming interface. The text and display may comprise text and display advertisements. The online service platform may comprise online advertise service platform such as search engine platform that also presents advertisements or information associated with entered search keywords.

15 Claims, 3 Drawing Sheets

AUTOMATIC GENERATION OF TEXT AND DISPLAY FOR PRESENTATION ON ONLINE COMPUTERS

FIELD

The present application relates generally to computers, and computer applications, and more particularly to automatically generating text and display on a computer.

BACKGROUND

The wide spread of the Internet and its use provide opportunities to present a variety of information to a variety of audiences. Internet advertising, for example, has evolved with a number of models for promoting or marketing products and services on the Internet, for example, based on different criteria that automatically may select different target audiences. Search engines, for instance, provide online advertising capabilities, in which information may be configured for displaying advertisements to appear on web pages in various forms.

BRIEF SUMMARY

A method, system and a computer program product for automatically generating text and display on online computers may be provided. A method, in one aspect, may comprise receiving periodically data associated with an inventory of items via one or more networks from a provider of the items. The method may also comprise storing the data on a computer server. The method may further comprise computing payment information associated with one or more of the items in the inventory, the payment information comprising payment schedule over a period of time. The method may also comprise creating a provider account associated with the provider on an online advertising service, wherein an account on an online advertising service is created per the provider. The method may also comprise connecting to an online advertising service application programming interface (API) via the one or more networks, the online advertising service API associated with the online advertising service. The method may further comprise, for each of the items, generating an advertisement text for an item via the online advertising service API, the advertisement text comprising at least keywords associated with the item, the payment information if computed for the item and an advertisement copy associated with the item.

A system for generating text and display for presentation on a computer, in one aspect, may comprise a computer server having one or more network connections operable to connect the computer server with a plurality of computing devices. A data storage device may be connected to the computer server. The computer server may be operable to periodically receive data associated with an inventory of items via the one or more network connections from first one or more of the plurality of computing devices. The first one or more of the plurality of computing devices may be associated with a provider of the items, and the data may be stored on the data storage device. The computer server may be further operable to compute payment information associated with one or more of the items in the inventory. The payment information comprises payment schedule over a period of time. The computer server may be further operable to create a provider account associated with the provider on an online advertising service. An account on an online advertising service may be created per the provider. The computer server may be further operable to connect to an online advertising service application programming interface (API) via the one or more network connections. The online advertising service API may be associated with the online advertising service, and the online advertising service may be provided on second one or more of the plurality of computing devices. For each of the items, the computer server may be operable to generate an advertisement text for an item via the online advertising service API. The advertisement text comprises at least keywords associated with the item, the payment information if computed for the item and an advertisement copy associated with the item.

A computer readable storage medium storing a program of instructions executable by a machine to perform a method of generating text and display for presentation on a computer described herein may also be provided.

Further features as well as the structure and operation of various embodiments are described in detail below with reference to the accompanying drawings. In the drawings, like reference numbers indicate identical or functionally similar elements.

DETAILED DESCRIPTION

A methodology that automatically generates text and display for presentation on a computer is disclosed. Particularly, a methodology of the present disclosure in one embodiment automatically generates text and display information content (e.g., advertisements) for an online service that displays information. Examples of such online service may include online advertising services such as GOOGLE™ or BING™ pay per click platform, or another. An online search engine service, for example, may include such online advertising service. In one embodiment of the present disclosure, data content is received from providers offering items via one or more communication networks, and information content (e.g., advertisement) is created based on the received data content. The data content is dynamic in that the updates to the data content or new data content are received periodically, e.g., in a continuous or continual manner via one or more network connections. The generated information content (e.g., advertisement) may include dynamic text and image. The methodology of the present disclosure also assigns keywords associated with the information content (e.g., advertisement) and provides those keywords to the online (e.g., advertising) service. The keywords are used by the online (e.g., advertising) service (e.g., software or another computer-implement tool) to determine the manner of presenting the information content (e.g., advertisements).

The methodology of the present disclosure may be implemented using a computer programming language such as PHP and Javascript, for example, which runs on a Linux server, or another computer system. Other computer languages and/or operating systems may be used.

Figure 1:
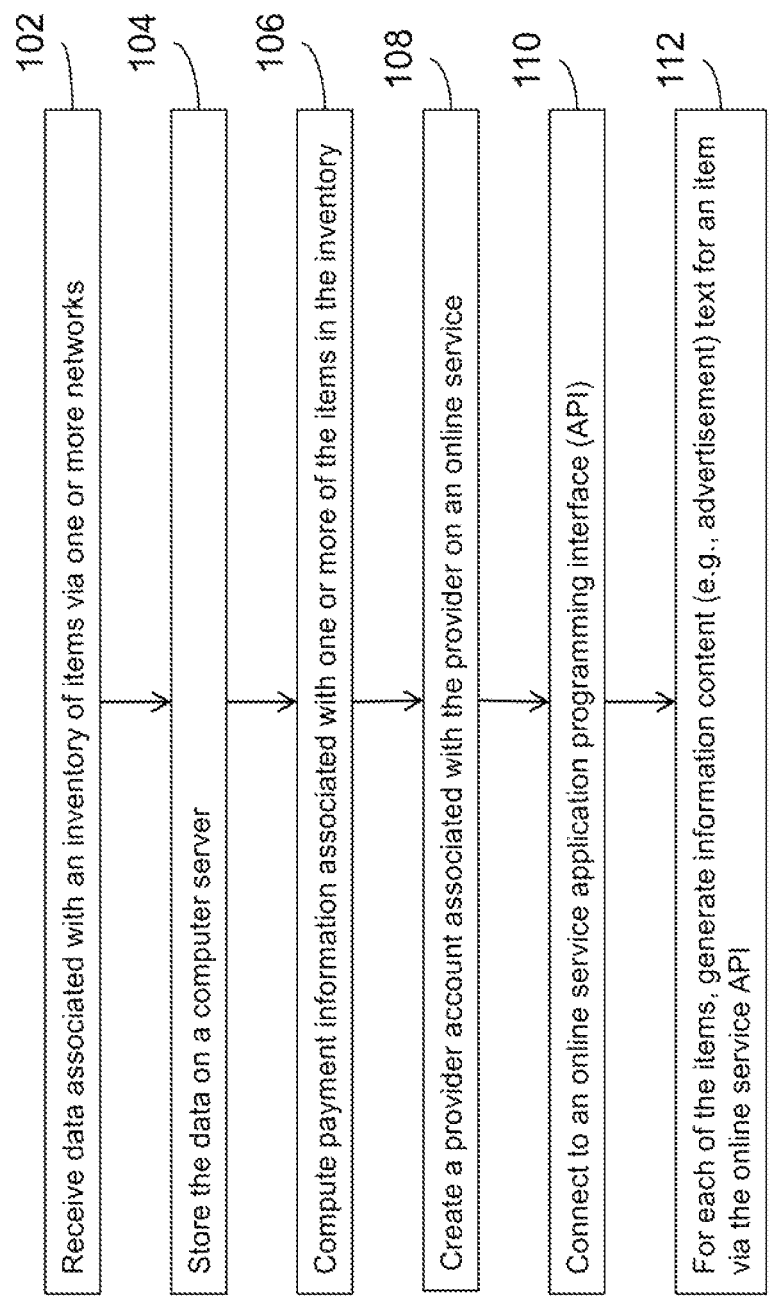
FIG. 1 is a flow diagram illustrating a method of generating text and display in one embodiment of the present disclosure.

FIG. 1 is a flow diagram illustrating a method of generating text and display in one embodiment of the present disclosure. At 102, data associated with an inventory of items is received, e.g., periodically, via one or more networks from a provider of the items. At 104, the data is stored on a computer server. The computer server may comprise a computer platform, for example, including an operating system and underlying computer hardware. The received data is utilized to generate the dynamic information content (e.g., advertisement).

As an example, data feeds (data) may be received in a computer file format, e.g., .txt or .csv (comma separated values) format, e.g., via file transfer protocol (FTP). In one aspect, a data file folder may be created on the computer server per provider, e.g., for each provider of data. The provider may be provided FTP credentials to the folder. The provider may transmit or deliver a fresh file to the computer server on a periodic basis, e.g., daily basis. The file may include the entire inventory of items offered by the provider. Thus, e.g., data feeds may be uploaded, e.g., regularly, to the computer server via FTP from various data collection companies or entities. Example of data collection companies or entities may include an automobile dealership that uploads its inventory data regularly.

The methodology of the present disclosure in one embodiment parses this data (e.g., inventory data uploaded to a file folder by the provider or data collection companies) and stores it in a database on the computer server. For example, the data is parsed for description or attributes of the items, price information, temporal range (e.g., time range of offer, if applicable), image of the items, and other information used in creating an information content, e.g., for advertisement (e.g., text and image). Known data parsing techniques may be used to convert the data file into a tabulated database form.

As an example, the provider may be an automotive dealership, and the data file may include the entire vehicle inventory for the dealership. The inventory may include individual data fields for each vehicle the dealership has in stock at the time the file was created. Each vehicle may contain data fields such as: VIN (vehicle identification information) code; Stock Number; MSRP (Manufacturer Suggested Retail price); Internet Price; Discount Price; Exterior Color; Interior Color; Vehicle year; Vehicle Make; Vehicle Model; Vehicle Trim Level; Vehicle Mileage; Drivetrain; Miles per gallon for highway and street driving; Body Style; Transmission Type; Engine Type; A wide array of vehicle options such as compact disk (cd) player, suspension options, power options, center console, air conditioning etc.; Vehicle Description; 0-40 Vehicle Photos (a link is provided for us to download the images from). The data received may be parsed for such information and stored in database on a computer server.

At 106, payment information associated with one or more of the items in the inventory is computed. The payment information may comprise payment schedule over a period of time, e.g., monthly payments that needed to be made if a buyer were to purchase or otherwise accept the offered item. For instance, in the vehicle inventory data from an automotive dealership, monthly payments for each vehicle, e.g., based on criteria provided by the dealership, may be calculated. For example, the vehicle price in the inventory feed (data) is used along with the information below to calculate the payment. For example, the following information may be collected for calculating the payment: Annual Percentage Rate; Maximum Payment to Show; Minimum Payment to Show; Down Payment Amount (e.g., fixed amount or percentage of the vehicle price); 48 Month Maximum-Any vehicle up to this year will use 48 month financing; 60 Month Maximum-Any vehicle between the 48 month max up to this year will use 60 month financing, any vehicle newer than the 60 month maximum will use 72 month financing. The last two example criteria use date ranges and tie them to possible financing terms. For instance, for 2014-2012 vehicle, allow 72 months financing; for 2011-2009 vehicle, allow 60 months financing; for 2010 or older vehicles, allow 48 months financing.

As an example, a monthly payment may be calculated using the following formula:
AMT=Loan Amount
J=Monthly Interest
N=Term in months $$\text{Payment}=AMT*((J*(1+J)^{72})/((1+J)^{72}-1))$$

At 108, a provider account is created that is associated with the provider on an online (e.g., advertising) service. In one embodiment of the present disclosure, an account on an online (e.g., Internet advertising) service is created per provider. An example of an online (e.g., advertising) service includes GOOGLE™ Adwords. A sub-account, e.g., may be created for each provider on such online (e.g., advertising) service. Setting up an account may further include specifying or configuring information associated with the account. For example, campaign data such as categories of items being offered, regional radius targeting or location targeting (location of audience to whom the information content or advertisement is targeted) and automated bidding strategy may be configured in setting up an account associated with the provider.

At 110, a connection is made to an online (e.g., advertising) service application programming interface (API) via the one or more networks. An online (e.g., advertising) service API is associated with the online (e.g., advertising) service. An example of an online advertising service API includes GOOGLE™ Adwords API.

At 112, for each of the items, an information content (e.g., advertisement) text for an item is generated via the online (e.g., advertising) service API. For example, the information content may comprise keywords associated with the item, the payment information if computed for the item, text description of the item, and one or more images of the item. The information content may be for advertising the item being offered. Thus, for example, the advertisement text may comprise at least keywords associated with the item, the payment information if computed for the item and an advertisement copy associated with the item. An advertisement copy refers to text content of the advertisement. In addition, one or more advertisement images may be generated for the item via the online advertising service API. Advertisement images may be generated automatically based on images included in the data file (e.g., inventory feed) received from the provider of the data file. For example, images of vehicles for advertisement may have been provided in the data feed from an automobile dealership. As described above, an advertisement copy (text content of the advertisement) and payment information/schedule are automatically in one embodiment of the present disclosure.

Keywords associated with the item are assigned to the information content (e.g., advertisement content that includes advertisement copy and/or image), e.g., using the online (e.g., advertising) service API. The methodology of the present disclosure in one embodiment generates the keywords based on the data received from the provider, e.g., at 102, that may include the description of an item that is being offered. Keyword generation may utilize techniques that parse text or data and rank the parsed data, e.g., according to the frequency of occurrence, close proximity to other words in the data. Other techniques may be used to generate keywords. An embodiment of the present disclosure includes automatically generating the keywords based on the received data feed. For example, for automobile advertisement, keywords may be generated based on the year, make, and model of the vehicle.

In one aspect, a methodology of the present disclosure may use broad match keywords that match an item, e.g., a vehicle. For example, the keyword for any vehicle may follow this pattern: +year+make+model. In this example, as long as the keywords are included (in any order) in the search the vehicle ad (advertisement) will pop up, e.g., presented on a user display device. So if someone searched "used 2012 Toyota Yaris", an advertisement generated according to a methodology of the present disclosure will be delivered since it includes the year, make and model. The methodology of the present disclosure in one embodiment may also generate a generic Ad group (a set of keywords, advertisement and bids registered with an online advertising service) for each make/model combination and utilize the following keywords: (+used+make+model) and (+certified+make+model). This Ad will generate text detailing the number of vehicles of the make/models in stock as well as listing the lowest monthly payment from the make/models available in stock.

In one aspect, the generated advertisement text is used by the online advertising service to trigger a presentation of advertisement copy and/or image. For instance, a potential buyer may enter one or more keywords, e.g., on an online search engine (e.g., provided by the online advertising service). If the one or more keywords and other criteria (e.g., location target) match with the generated advertise text, then the online advertising service may present the advertisement to the potential buyer. Thus, for example, one or more of the keywords entered on a computer user interface associated with the online advertising service triggers presentation on the computer user interface, of the payment information with at least one of the advertisement copy and the advertisement image corresponding to the one or more of the keywords.

The following describes a specific example of generating text advertisements via an API connection, using GOOGLE™ Adword API, and items as vehicles. For instance, data associated with inventory of vehicles from an automotive dealership may be received, stored and parsed. The methodology of the present disclosure in one embodiment creates individual advertisements for each vehicle in the inventory feed. If payment schedule has been established for that vehicle, the payment schedule is included in the advertisement copy (text content). If there is no payment calculation, generic advertisement copy relating to the vehicle may be used. As a particular example, a Google™ Ad group is created for each vehicle via the Adwords API. Once the Ad group has been created, the text advertisement is added to the Ad group via the API. The keywords to target are added to the text advertisement via the API.

In addition, display advertisements may be generated via API connection. Using the inventory feed data that is stored in the database, the methodology of the present disclosure may create image advertisements to be displayed, e.g., on a display network such as the GOOGLE™ Display network. In one embodiment of the present disclosure, a base template is used as a background for the image. The methodology of the present disclosure may overlay various information about the vehicle (or another item being offered) onto the template, including an image of the vehicle (or item), price information, a trackable phone number, and dealer information.

Yet in another embodiment of the present disclosure, existing accounts may be updated. For example, the methodology of the present disclosure may compare new data received from a provider to the existing information created via the online service API. The existing information may be updated with any new information from the new data via the API.

Taking the automotive dealership example, the methodology of the present disclosure in one embodiment compares the new vehicle data feed to the existing advertisements that have been created. The methodology may use a combination of information obtained from the local database, e.g., local to a computer server implementing a methodology of the present disclosure, as well as the information it gathers from currently published advertisements via the API to look for any changes that may have occurred. Existing advertisement are updated, as needed, via the API. For example, any vehicles that are no longer in inventory have their advertisements paused, and new advertisements are created for new vehicle in inventory. This update process may be performed via the API.

As described above, an example of the information content that is generated is text and display advertisements, for vehicles offered by an automotive dealership. The methodology in this respect may comprise receiving periodically data associated with an inventory of vehicles into a data folder on a storage device associated with a computer server via a file transfer protocol (FTP) from an automotive dealership. The methodology may be provided for a plurality of such dealerships. The data folder is created per automotive dealership, and each automotive dealership is provided with respective FTP credentials. A periodic payment schedule (e.g., a monthly payment schedule) for each of the vehicles based on one or more criteria provided by the automotive dealership may be computed, and an individual advertisement for each of the vehicles may be generated. The individual advertisement may include at least an advertisement copy and the periodic payment schedule. The individual advertisement for each of the vehicles may be generated by creating a provider account associated with the automotive dealership on an online advertising service, an account on an online advertising service created per automotive dealership, connecting to an online advertising service application program interface (API) via one or more networks, the online advertising service API associated with the online advertising service, for each of the vehicles, generating an advertisement text for a vehicle via the online advertising service API. The advertisement text may include at least keywords associated with the vehicle, the period payment schedule for the vehicle and the advertisement copy associated with the vehicle. One or more advertisement images for the vehicle may be created.

Figure 2:
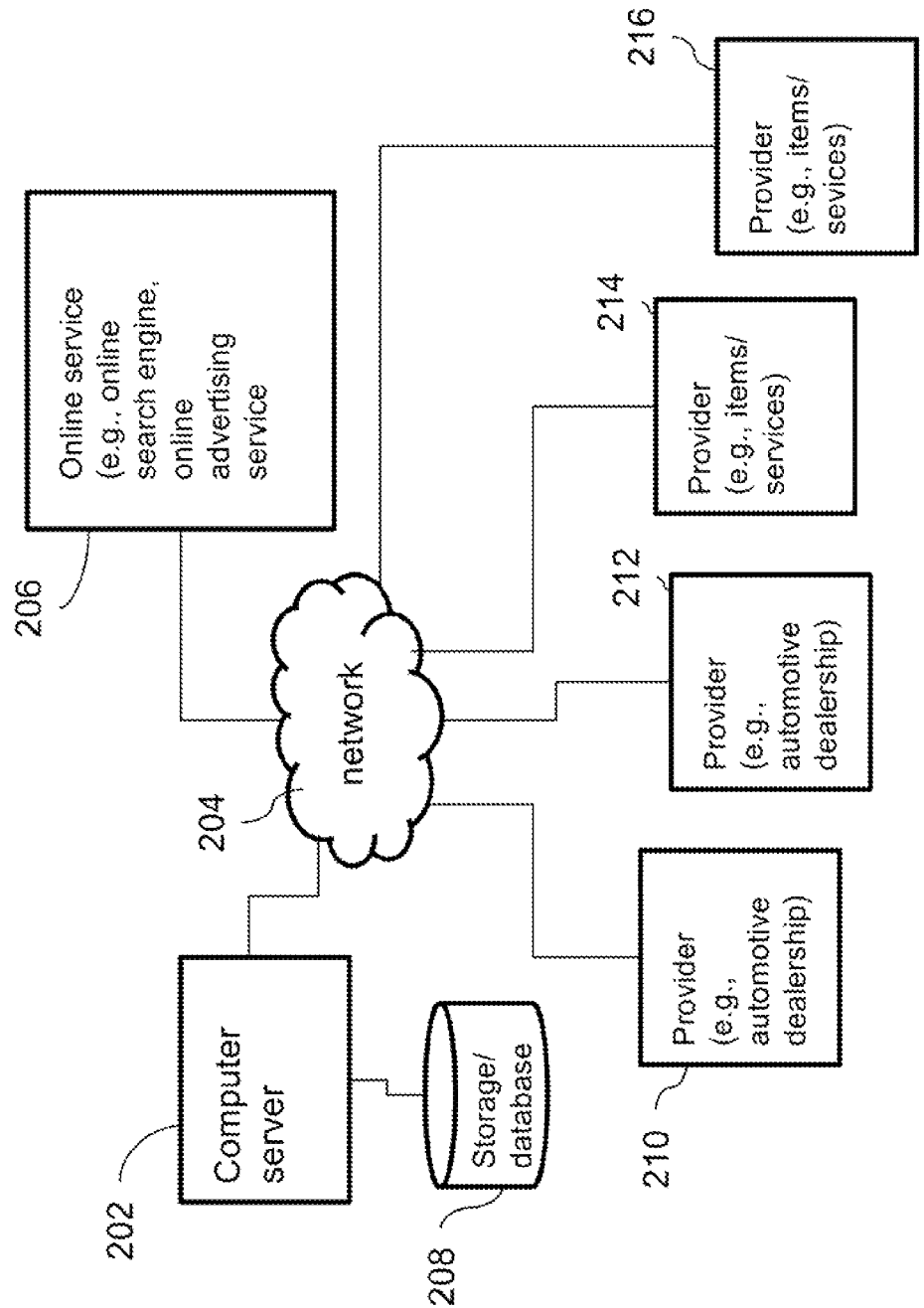
FIG. 2 is a diagram illustrating a system of generating text and display in one embodiment of the present disclosure.

FIG. 2 is a diagram illustrating a system of generating text and display in one embodiment of the present disclosure. A computer server 202 including one or more network connections connects to a plurality of computing devices, for example, via a network 204. The plurality of computing devices may include computing devices of providers 210, 212, 214, 216 offering items (e.g., products or services) for purchasing or leasing, etc. An example of a provider includes an automotive dealership (e.g., 210, 212). The present disclosure contemplates providers that offer other items (e.g., real estate agency that lists real estate). The plurality of computing devices may also include devices that run online services 206, e.g., online search engine and online advertising service. Examples of such services include GOOGLE™ and BING™.

The computer server also may include or is connected to a data storage device 208, for example, locally or remotely via one or more network connections. The computer server 202 receives periodically, data associated with an inventory of items via one or more network connections from one or more of the plurality of computing devices associated with one or more providers of the items (referred to as first one or more of the plurality of computing devices), e.g., 210, 212, 214, 216. The computer server 202 stores the received data on the data storage device 208.

The computer server 202 also computes payment information associated with one or more of the items in the inventory. The payment information includes payment schedule over a period of time, e.g., monthly payments, mortgage schedule.

The computer server 202 creates a provider account associated with the provider on an online service 206. For each provider (e.g., 210, 212), the computer server 202 create an online account, e.g., an account per provider. The computer server 202 connects to an online service's application program interface (API) via one or more network connections, e.g., provided on one or more of the plurality of computing devices (referred to as second one or more of the plurality of computing devices, e.g., 206.

For each of the items listed or described in the data received from a provider (e.g., 210, 212, 214 or 216), the computer server generates information (e.g., advertisement) text for an item via the online service API, e.g., online advertisement service API such as GOOGLE™'s Adwords API. The information (e.g., advertisement) text includes at least keywords associated with the item, the payment information if computed for the item and description content (e.g., an advertisement copy) associated with the item. The computer server 202 also may generate an image for the item, for example, an advertisement image of the item.

For example, one or more of the keywords entered on a computer user interface associated with the online service triggers a presentation of the information content configured into the online service on the user interface. For instance, a user may enter one or more keywords on a search engine user interface. An online advertisement service associated with the search engine may compare the entered keyword with the keywords configured via an API associated with that online advertisement service, and if there is a match, payment information with at least one of the advertisement copy and the advertisement image corresponding to the one or more of the keywords may be presented.

In one embodiment, the computer server 202 may receive the data in a computer file format via a file transfer protocol (FTP) over one or more network connections. Data from the providers 210, 212, 214, 216, may be transmitted or received in the computer server 202 via other transfer or transmission methods. The data received is dynamic in that the data is transmitted or received periodically (e.g., on a daily basis) with updates.

The data storage 208 may include a file folder created per provider, and the provider is given FTP credentials to the file folder to allow the provider to transmit the data to the file folder.

As described above, the items whose information (e.g., advertisements) are being configured may include a variety of items from a variety of providers. Examples include vehicles from dealerships, real estate listings from a real estate agency or the like. In the case of a real estate listing, the computed payment schedule may be an amortization schedule based on collected information such as the term length of mortgage, the type of loan, and the current interest rates.

In one aspect, the functionalities and modules of the system and methods of the present disclosure may be implemented or carried out distributedly on different processing systems or on any single platform, for instance, accessing data stored locally or distributedly on the network.

Various aspects of the present disclosure may be embodied as a program, software, or computer instructions embodied or stored in a computer or machine usable, readable or executable medium, which causes the computer or machine to perform the steps of the method when executed on the computer, processor, and/or machine. For instance, a program storage device or storage medium readable by a machine, tangibly embodying a program of instructions executable by the machine to perform various functionalities and methods described in the present disclosure may be provided. A program storage device or computer readable storage medium may include, but are not limited to, devices such as a hard disk, a random access memory (RAM), a read-only memory (ROM), an erasable programmable read-only memory (EPROM), flash memory, a static random access memory (SRAM), a portable compact disc read-only memory (CD-ROM), a digital versatile disk (DVD), a removable flash memory card, a floppy disk, and other devices that can store computer executable instructions and readable by a machine. Such program storage device or computer readable storage medium excludes transitory signals per se. A computer program product may include such program storage device or computer readable storage medium.

The system and method of the present disclosure may be implemented and run on a general-purpose computer or special-purpose computer system. The computer system may be any type of known or will be known systems and may include a hardware processor, memory device, a storage device, input/output devices, internal buses, and/or a communications interface for communicating with other computer systems in conjunction with communication hardware and software, etc.

Figure 3:
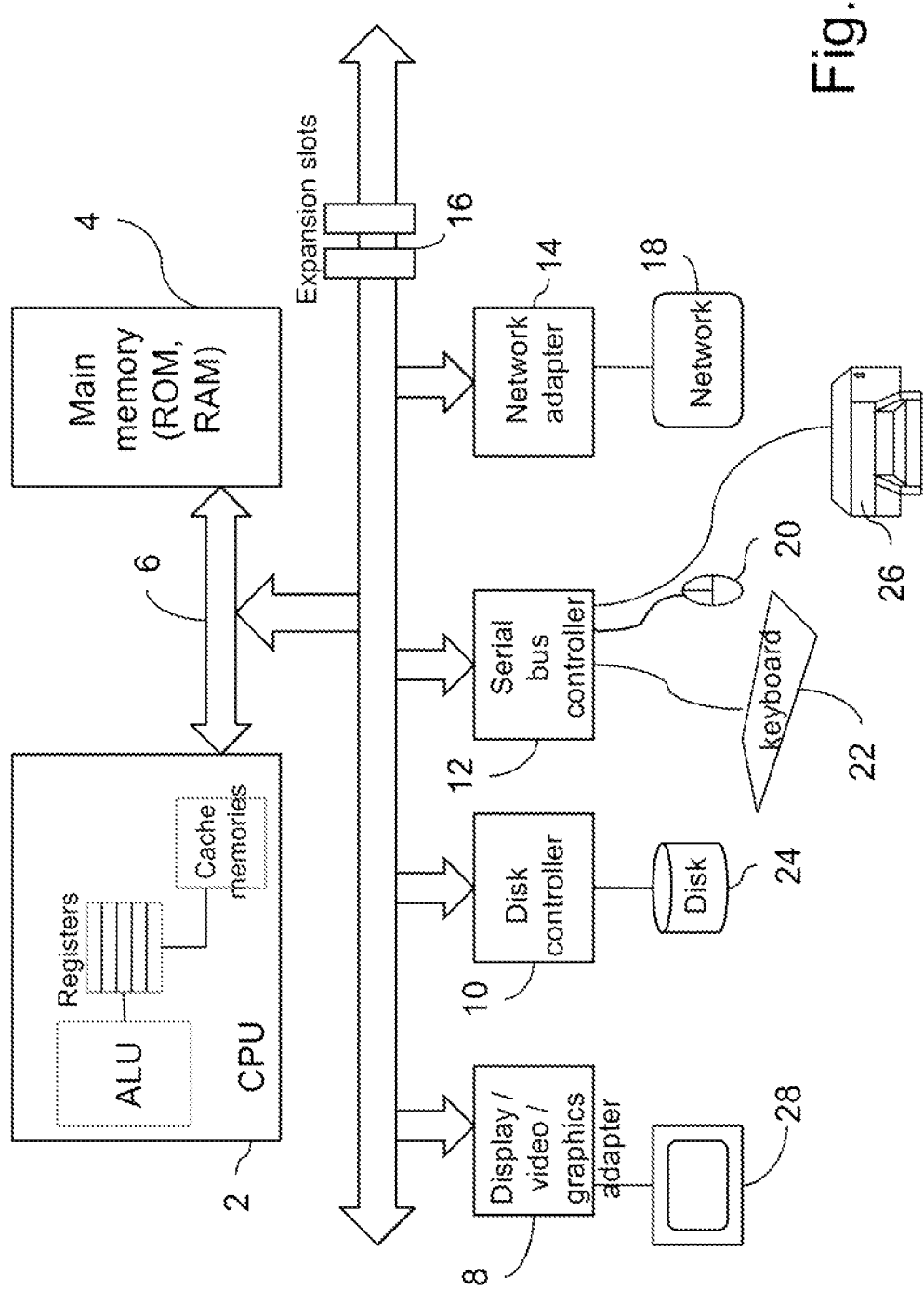
FIG. 3 illustrates an example computer system that may implement the system and/or method of the present disclosure.

FIG. 3 illustrates an example computer system that may implement the system and/or method of the present disclosure. One or more central processing units (e.g., CPUs) 2 may include one or more arithmetic/logic unit (ALU), fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 2 uses. Shown is a simplified hardware configuration. CPU 2 may include other combination circuits and storage devices. One or more central processing units (CPUs) 2 execute instructions stored in memory 4, for example, transferred to registers in the CPU 2. Buses 6, for example, are electrical wires that carry bits of data between the components. Memory 4 may include an array of dynamic random access memory (DRAM) chips, and store program and data that CPU 2 uses in execution. The system components may also include input/output (I/O) controllers and adapters connected to the CPU 2 and memory 4 via a bus, e.g., I/O bus and connect to I/O devices. For example, display/graphic adapter connects 8 a monitor 28 or another display device/terminal; disk controller 10 connects hard disks 24, for example, for permanent storage; serial controller 12 such as universal serial bus (USB) controller may connect input devices such as keyboard 22 and mouse 20, output devices such as printers 26; network adapter 14 connects the system to another network, for example, to other machines. The system may also include expansion slots to accommodate other devices to connect to the system. For example, a hard disk 24 may store the program of instructions and data that implement the above described methods and systems, which may be loaded into the memory 4, then into the CPU's storage (e.g., caches and registers) for execution by the CPU (e.g., ALU and/or other combination circuit or logic). In another aspect, all or some of the program of instructions and data implementing the above described methods and systems may be accessed, and or executed over the network 18 at another computer system or device. FIG. 3 is only one example of a computer system. The computer system that may implement the methodologies or system of the present disclosure is not limited to the configuration shown in FIG. 3. Rather, another computer system may implement the methodologies of the present disclosure, for example, including but not limited to special processors such as field programmable gate array (FPGA) and accelerators.

The terms "computer system" and "computer network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of automatically generating text and display advertisements for presentation on a computer, comprising:
   receiving periodically data associated with an inventory of vehicles into a data folder on a storage device associated with a computer server via a file transfer protocol (FTP) from an automotive dealership, wherein the data folder is created per the automotive dealership, the automotive dealership provided with FTP credentials;
   computing a periodic payment schedule for each of the vehicles based on one or more criteria provided by the automotive dealership, the periodic payment schedule comprising payments that need to be made for purchasing or accepting said respective each vehicle;
   generating an individual advertisement for each of the vehicles, the individual advertisement comprising at least an advertisement copy and the periodic payment schedule, the generating an individual advertisement for each of the vehicles comprising:
   creating a provider account associated with the automotive dealership on a search engine comprising an online advertising service, wherein an account on an online advertising service is created per the automotive dealership;
   connecting to an online advertising service application programming interface (API) via one or more networks, the online advertising service API associated with the online advertising service; and
   for each of the vehicles, generating one or more keywords based on the received data, and generating an advertisement text for a vehicle via the online advertising service API, the advertisement text comprising at least the one or more keywords associated with the vehicle, the period payment schedule for the vehicle and the advertisement copy associated with the vehicle, the one or more keywords provided to the search engine for determining a manner of presenting the advertisement text.

2. The method of claim 1, further comprising generating an advertisement image for the vehicle via the online advertising service API.

3. The method of claim 2, wherein one or more of the keywords entered on a computer user interface associated with the online advertising service triggers presentation on the computer user interface, of the periodic payment schedule with at least one of the advertisement copy and the advertisement image corresponding to the one or more of the keywords.

4. The method of claim 2, wherein the generating an advertisement image for the vehicle comprises overlaying information associated with the vehicle on a base template image, the base template image comprising a background image and the information that is overlayed comprises at least an image of the vehicle, price information, and information associated with the automotive dealership.

5. The method of claim 1, further comprising updating via the online advertising service API the advertisement text for the vehicle based on dynamic content of the data received periodically.

6. A system for generating text and display for presentation on a computer, comprising:
   a computer server having one or more network connections operable to connect the computer server with a plurality of computing devices;
   a data storage device connected to the computer server,
   the computer server operable to receive periodically data associated with an inventory of vehicles into a data folder on the storage device associated with the computer server via a file transfer protocol (FTP) from an automotive dealership, wherein the data folder is created per the automotive dealership, the automotive dealership provided with FTP credentials,
   the computer server further operable to compute a periodic payment schedule for each of the vehicles based on one or more criteria provided by the automotive dealership, the periodic payment schedule comprising payments that need to be made for purchasing or accepting said respective each vehicle,
   the computer server further operable to generate an individual advertisement for each of the vehicles, the individual advertisement comprising at least an advertisement copy and the periodic payment schedule, wherein the computer server is operable to generate the individual advertisement for each of the vehicles by at least:
   creating a provider account associated with the automotive dealership on a search engine comprising an online advertising service, wherein an account on an online advertising service is created per the automotive dealership;
   connecting to an online advertising service application programming interface (API) via one or more networks, the online advertising service API associated with the online advertising service; and
   for each of the vehicles, generating one or more keywords based on the received data, and generating an advertisement text for a vehicle via the online advertising service API, the advertisement text comprising at least the one or more keywords associated with the vehicle, the period payment schedule for the vehicle and the advertisement copy associated with the vehicle, the one or more keywords provided to the search engine for determining a manner of presenting the advertisement text.

7. The system of claim 6, wherein the computer server is further operable to generate an advertisement image for the vehicle via the online advertising service API.

8. The system of claim 7, wherein the system further comprises a computer user interface, wherein one or more of the keywords entered on the computer user interface triggers presentation on the computer user interface, of the periodic payment schedule with at least one of the advertisement copy and the advertisement image corresponding to the one or more of the keywords.

9. The system of claim 7, wherein, to generate the advertisement image, the computer server is further operable to overlay information associated with the vehicle on a base template image, the base template image comprising a background image and the information that is overlayed comprises at least an image of the vehicle, price information, and information associated with the automotive dealership.

10. The system of claim 6, wherein the computer server is further operable to update via the online advertising service API the advertisement text for the vehicle based on dynamic content of the data received periodically.

11. A computer readable storage medium storing a program of instructions, wherein the computer readable storage medium is not a transitory signal per se, the program of instructions executable by a machine to perform a method of automatically generating text and display advertisements for presentation on a computer, the method comprising:
receiving periodically data associated with an inventory of vehicles into a data folder on a storage device associated with a computer server via a file transfer protocol (FTP) from an automotive dealership, wherein the data folder is created per the automotive dealership, the automotive dealership provided with FTP credentials;
computing a periodic payment schedule for each of the vehicles based on one or more criteria provided by the automotive dealership, the periodic payment schedule comprising payments that need to be made for purchasing or accepting said respective each vehicle;
generating an individual advertisement for each of the vehicles, the individual advertisement comprising at least an advertisement copy and the periodic payment schedule, the generating an individual advertisement for each of the vehicles comprising:
creating a provider account associated with the automotive dealership on a search engine comprising an online advertising service, wherein an account on an online advertising service is created per the automotive dealership;
connecting to an online advertising service application programming interface (API) via one or more networks, the online advertising service API associated with the online advertising service; and
for each of the vehicles, generating one or more keywords based on the received data, and generating an advertisement text for a vehicle via the online advertising service API, the advertisement text comprising at least the one or more keywords associated with the vehicle, the period payment schedule for the vehicle and the advertisement copy associated with the vehicle, the one or more keywords provided to the search engine for determining a manner of presenting the advertisement text.

12. The computer readable storage medium of claim 11, further comprising generating an advertisement image for the vehicle via the online advertising service API.

13. The computer readable storage medium of claim 12, wherein one or more of the keywords entered on a computer user interface associated with the online advertising service triggers presentation on the computer user interface, of the periodic payment schedule with at least one of the advertisement copy and the advertisement image corresponding to the one or more of the keywords.

14. The computer readable storage medium of claim 12, wherein the generating an advertisement image for the vehicle comprises overlaying information associated with the vehicle on a base template image, the base template image comprising a background image and the information that is overlayed comprises at least an image of the vehicle, price information, and information associated with the automotive dealership.

15. The computer readable storage medium of claim 11, further comprising updating via the online advertising service API the advertisement text for the vehicle based on dynamic content of the data received periodically.

* * * * *